United States Patent
Okura et al.

(10) Patent No.: US 9,322,447 B2
(45) Date of Patent: Apr. 26, 2016

(54) METHOD AND APPARATUS FOR ADJUSTING SPRING CHARACTERISTICS OF A SPRING

(75) Inventors: Shinsuke Okura, Nagoya (JP); Shuji Kamiya, Nagoya (JP); Yukimasa Kabeya, Nagoya (JP); Junya Narukawa, Nagoya (JP); Takashi Goto, Nagoya (JP)

(73) Assignee: CHUO HATSUJO KABUSHIKI KAISHA, AICHI (JP)

( * ) Notice: Subject to any disclaimer, the term of this patent is extended or adjusted under 35 U.S.C. 154(b) by 953 days.

(21) Appl. No.: 13/522,629

(22) PCT Filed: Jan. 14, 2011

(86) PCT No.: PCT/JP2011/050547
§ 371 (c)(1),
(2), (4) Date: Jul. 17, 2012

(87) PCT Pub. No.: WO2011/087087
PCT Pub. Date: Jul. 21, 2011

(65) Prior Publication Data
US 2012/0285212 A1    Nov. 15, 2012

(30) Foreign Application Priority Data
Jan. 18, 2010   (JP) .................................. 2010-008422
Jan. 14, 2011   (WO) .................. PCT/JP2011/050547

(51) Int. Cl.
*F16F 1/04*   (2006.01)
*F16F 1/02*   (2006.01)

(52) U.S. Cl.
CPC .. *F16F 1/041* (2013.01); *F16F 1/02* (2013.01)

(58) Field of Classification Search
CPC ............... F16F 1/02; F16F 1/12; F16F 1/041; F16F 3/06; B21F 9/005
See application file for complete search history.

(56) References Cited

U.S. PATENT DOCUMENTS 4,856,765 A * 8/1989 Kohno .................... A47C 3/20
                                                        267/166
5,454,150 A * 10/1995 Hinke .................... B21F 35/00
                                                        267/166

(Continued)

FOREIGN PATENT DOCUMENTS

CN       100369152 C     2/2008
CN       100480535 C     4/2009

(Continued)

OTHER PUBLICATIONS

PCT International Preliminary Report on Patentability dated Aug. 7, 2012, International Application No. PCT/JP2011/050547.

(Continued)

*Primary Examiner* — Alexander P Taousakis
*Assistant Examiner* — Pradeep C Battula
(74) *Attorney, Agent, or Firm* — Vierra Magen Marcus LLP

(57) ABSTRACT

The present application provides a method for adjusting spring characteristics of a spring to desired spring characteristics. In the adjusting method of the present application, first, the spring is compressed until a "load-displacement" measurement line obtained by measuring the load applied to the spring and the displacement of the spring meets a "load-displacement" target line determined based on "load-displacement" characteristics of the spring and the desired spring characteristics (S10-S14). Next, the spring is expanded such that the load applied to the spring decreases along the "load-displacement" target line (S18).

6 Claims, 7 Drawing Sheets

(56) References Cited

U.S. PATENT DOCUMENTS

| | | | | |
|---|---|---|---|---|
| 5,930,897 | A * | 8/1999 | Wentzek | B21F 33/04 72/128 |
| 5,944,302 | A * | 8/1999 | Loc | F04B 35/045 267/180 |
| 6,481,702 | B1 * | 11/2002 | Fader | B60G 11/54 29/896.91 |
| 6,779,564 | B2 * | 8/2004 | Hasegawa | B60G 15/063 140/89 |
| 6,836,964 | B2 * | 1/2005 | Hasegawa | B21F 3/02 29/896.9 |
| 7,404,865 | B2 * | 7/2008 | Izumida | C21D 9/02 148/325 |
| 7,841,088 | B2 * | 11/2010 | Ogura | B60G 15/07 29/407.09 |
| 2004/0261514 | A1 | 12/2004 | Umebayashi | |
| 2004/0261541 | A1 | 12/2004 | Hussain | |
| 2005/0258582 | A1 | 11/2005 | Chou | |

FOREIGN PATENT DOCUMENTS

| | | |
|---|---|---|
| JP | S57-73246 A | 5/1982 |
| JP | H7-39015 B | 5/1995 |
| JP | 2004-355678 A | 12/2004 |
| TW | I243878 B | 11/2005 |
| TW | 200538654 A | 12/2005 |

OTHER PUBLICATIONS

English Translation of PCT Written Opinion of the International Searching Authority, dated Apr. 26, 2011, International Application No. PCT/JP2011/050547.

Machine Translation prepared by JPO and English Abstract of Japanese Publication No. JP H7-39015 published on May 1, 1995.

Machine Translation prepared by JPO; English Abstract and Patent Family List of Japanese Publication No. JP 2004-355678 published on Dec. 16, 2004.

English Abstract of Japanese Publication No. JP S57-73246 published on May 7, 1982.

PCT International Search Report dated Apr. 26, 2011, International Application No. PCT/JP2011/050547.

PCT Written Opinion dated Apr. 12, 2011, International Application No. PCT/JP2011/050547.

Office Action dated Jun. 27, 2014 in Indonesian Patent Application No. W00201203376, with English Translation of the Office Action, 4 pages.

Office Action dated Aug. 4, 2015, in Taiwanese Patent Application No. TW100101633.

* cited by examiner

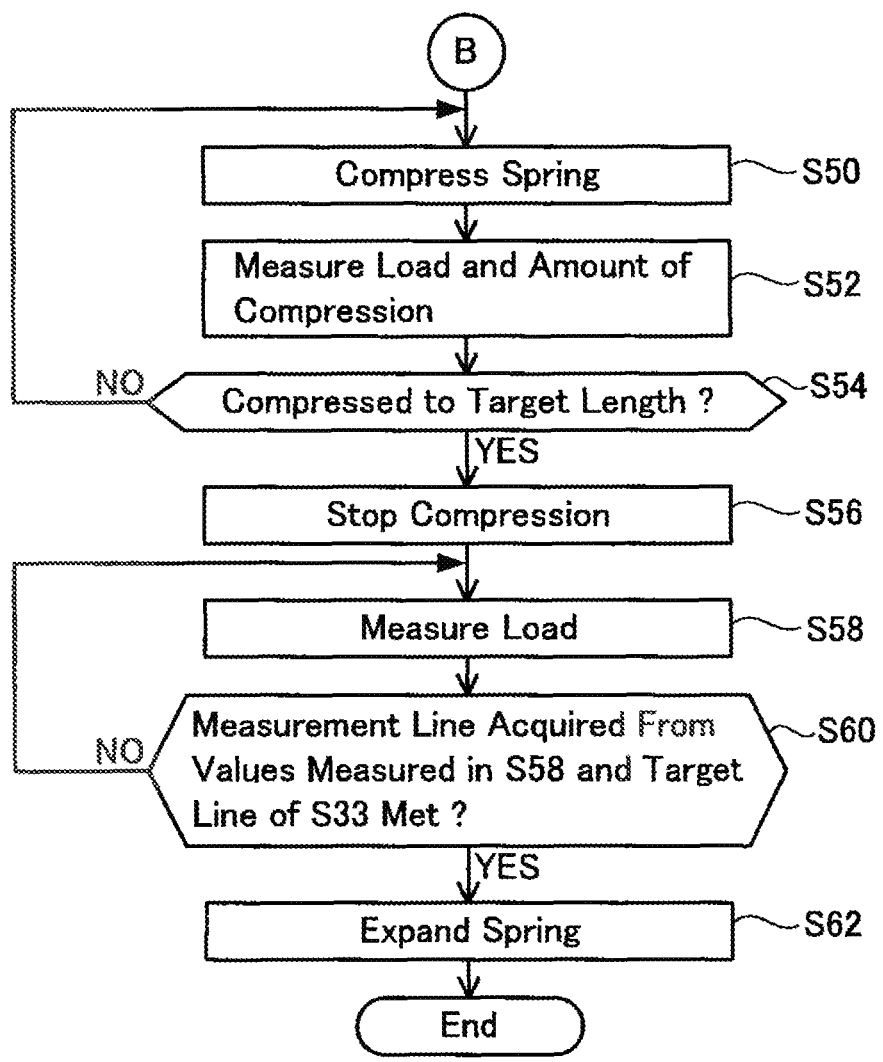

METHOD AND APPARATUS FOR ADJUSTING SPRING CHARACTERISTICS OF A SPRING

TECHNICAL FIELD

The present application relates to a technique for adjusting spring characteristics of a spring to desired spring characteristics.

DESCRIPTION OF RELATED ART

A technology for adjusting spring characteristics of a formed spring to desired spring characteristics is being developed. For instance, there has been developed a spring characteristics adjustment technology that uses a process for applying a compression load in an operation direction of a spring and plastically deforming the spring (so called "prestressing") to create a predetermined "installation load" when the spring is compressed to its "installation length." The method disclosed in Japanese Patent Publication No. H7-39015 compresses a spring, obtained before the prestressing, to a predetermined length to measure a load applied to the spring. The spring is then subjected to prestressing by adjusting the prestressing length or time based on the measured load value. The method disclosed in Japanese Patent Application Publication No. 2004-355678 obtains a spring constant of a spring prior to the prestressing, and then performs the prestressing by adjusting the prestressing amount of the spring based on the obtained spring constant.

BRIEF SUMMARY OF THE INVENTION

Technical Problem

The methods disclosed in the abovementioned patent literatures adjust the prestressing amount based on the load value measured prior to the prestressing (i.e., the load value obtained when the spring is compressed to the predetermined length) or based on the spring constant obtained prior to the prestressing. However, when adjusting the spring characteristics (when performing the prestressing), the spring needs to be deformed not only in its elastic region but also in its plastic region. The spring characteristics ("load-displacement" characteristics) of a formed spring vary individually in both the elastic region and the plastic region. The technologies disclosed in the abovementioned patent literatures measure the spring characteristics (the measured load value, the spring constant) in the elastic region and do not take into consideration the individual variations in the spring characteristics in the plastic region. Therefore, the technologies disclosed in the abovementioned patent literatures cannot adjust the spring characteristics accurately. An object of the present application is to provide a technology for accurately adjusting the spring characteristics of a spring.

Solution to the Technical Problem

A method disclosed in the present application is a method for adjusting spring characteristics of a spring to desired spring characteristics and comprises a first step and a second step performed subsequently to the first step. The first step changes a load applied to the spring and a displacement of the spring until a "load-displacement" measurement line meets a "load-displacement" target line, the "load-displacement" measurement line being obtained by measuring the load applied to the spring and the displacement of the spring, and the "load-displacement" target line being determined based on "load-displacement" characteristics of the spring and the desired spring characteristics. The second step changes the displacement of the spring such that the load applied to the spring decreases along the "load-displacement" target line.

The method described above first changes the load applied to the spring and the displacement of the spring until the "load-displacement" measurement line meets the "load-displacement" target line, while acquiring the "load-displacement" measurement line by measuring the load applied to the spring and the displacement of the spring. Thereafter, the method changes the displacement of the spring in a manner that the load decreases along the "load-displacement" target line. As a result, the desired spring characteristics (i.e., the characteristics according to the "load-displacement" target line) can be obtained. This method acquires the "load-displacement" measurement line of the spring by actually measuring the load applied to the spring and the displacement of the spring. Therefore, the load applied to the spring and the displacement of the spring can be measured at both an elastic region and a plastic region, and the spring characteristics can be adjusted based on the measurement results. The spring characteristics, therefore, can be adjusted accurately.

In the method described above, the "load-displacement" characteristics of the spring used for determining the "load-displacement" target line may preferably be a spring constant. In this case, it is preferred that the "load-displacement" characteristics be determined from the load applied to the spring and the displacement of the spring that are measured in the first step.

According to this configuration, the "load-displacement" characteristics of the spring used for determining the "load-displacement" target line are obtained as a result of actually measuring the load applied to the spring and the displacement of the spring. Therefore, the spring characteristics can be adjusted accurately.

When the individual variations in the "load-displacement" characteristics in the elastic region are not significant enough to affect the spring characteristics of the spring, the "load-displacement" characteristics of the spring used for determining the "load-displacement" target line may be determined based on measured values of several springs without having to measure the springs one by one. The "load-displacement" characteristics may alternately be determined based on a design drawing (design value). The "load-displacement" target line may be obtained before changing the load applied to the spring and the displacement of the spring, by determining the "load-displacement" characteristics based on the measured values of the several springs obtained beforehand or the design drawing.

In the method described above, it is preferred that the first step may execute the following first, second, and third substeps, when the desired spring characteristics are an "installation length" of the spring and an "installation load" of the spring generated when the spring is compressed to the "installation length." The first substep may compress the spring until a length of the spring reaches a first predetermined length. Subsequent to the first substep, the second substep may measure the "load-displacement" characteristics of the spring by measuring the load and the displacement of the spring while expanding the spring until the length of the spring reaches a second predetermined length. Subsequent to the second substep, the third substep may change the load applied to the spring and the displacement of the spring while measuring the load and the displacement of the spring until the "load-displacement" measurement line meets the "load-displacement" target line.

According to this configuration, after the spring is compressed until the length thereof reaches the first predetermined length, the "load-displacement" characteristics of the spring are measured while expanding the spring until the length thereof reaches the second predetermined length. As a result, the "load-displacement" characteristics of the spring can be measured after the spring is plastically deformed by the compression generated prior to the end of the first substep. Therefore, the "load-displacement" characteristics of the spring can be measured accurately, and the spring characteristics can be adjusted accurately.

In the method described above, when the desired spring characteristics are the "installation length" of the spring and the "installation load" of the spring generated when the spring is compressed to the "installation length," the first step may compress the spring until the length of the spring reaches a predetermined length, and thereafter deform the spring by mechanical creep until the "load-displacement" measurement line meets the "load-displacement" target line.

According to this configuration, changing the load applied to the spring without displacing the spring can allow the "load-displacement" measurement line to meet the "load-displacement" target line.

In the method described above, the desired spring characteristics are the "installation length" of the spring and the "installation load" of the spring generated when the spring is compressed to the "installation length," and the first and second steps may change the load applied to the spring and the displacement of the spring in a warm state. In this case, the "installation load" of the spring may preferably be adjusted based on a temperature of the spring measured during or before the first step.

When the temperature of the spring changes, the load generated in the spring changes accordingly. Therefore, when the first and second steps are executed in the warm state, adjusting the target "installation load (i.e., the load generated when the spring is compressed to the "installation length")" in accordance with the temperature of the spring can provide the spring with the desired spring characteristics. In addition, adjusting the installation load while converting the measured load value or the spring constant into a normal temperature also can provide the spring with the desired spring characteristics.

The present application may also provide an apparatus for adjusting spring characteristics of a spring to desired spring characteristics. This apparatus has: inputting means for inputting information on the desired spring characteristics; displacement/load applying means for applying the spring with an arbitrary displacement and an arbitrary load; displacement/load measuring means for measuring the displacement and the load of the spring applied by the displacement/load applying means; and controlling means for controlling the displacement/load applying means based on the information on the desired spring characteristics inputted by the inputting means and the displacement and load of the spring measured by the displacement/load measuring means. The controlling means executes a first step and a second step. In the first step, the load applied to the spring and the displacement of the spring are changed by the displacement/load applying means until a "load-displacement" measurement line meets a "load-displacement" target line, the "load-displacement" measurement line being obtained from the load applied to the spring and the displacement of the spring measured by the displacement/load measuring means, and the "load-displacement" target line being determined based on "load-displacement" characteristics of the spring and the input desired spring characteristics. In the second step after the first step, the displacement of the spring applied by the displacement/load applying means is changed such that the load applied to the spring decreases along the "load-displacement" target line. This apparatus can favorably implement the spring characteristic adjusting method according to the present application.

BRIEF DESCRIPTION OF DRAWINGS

FIG. 6B is a flowchart (2) for explaining the adjustment procedure for the spring according to Embodiment 3.

DETAILED DESCRIPTION OF INVENTION

A spring characteristics adjusting apparatus (simply referred to as "adjusting apparatus" hereinafter) according to an embodiment is now described with reference to the drawings. An adjusting apparatus 2 according to the present embodiment is used for adjusting spring characteristics of a spring to desired spring characteristics. The spring is formed into a coil spring.

Figure 1:
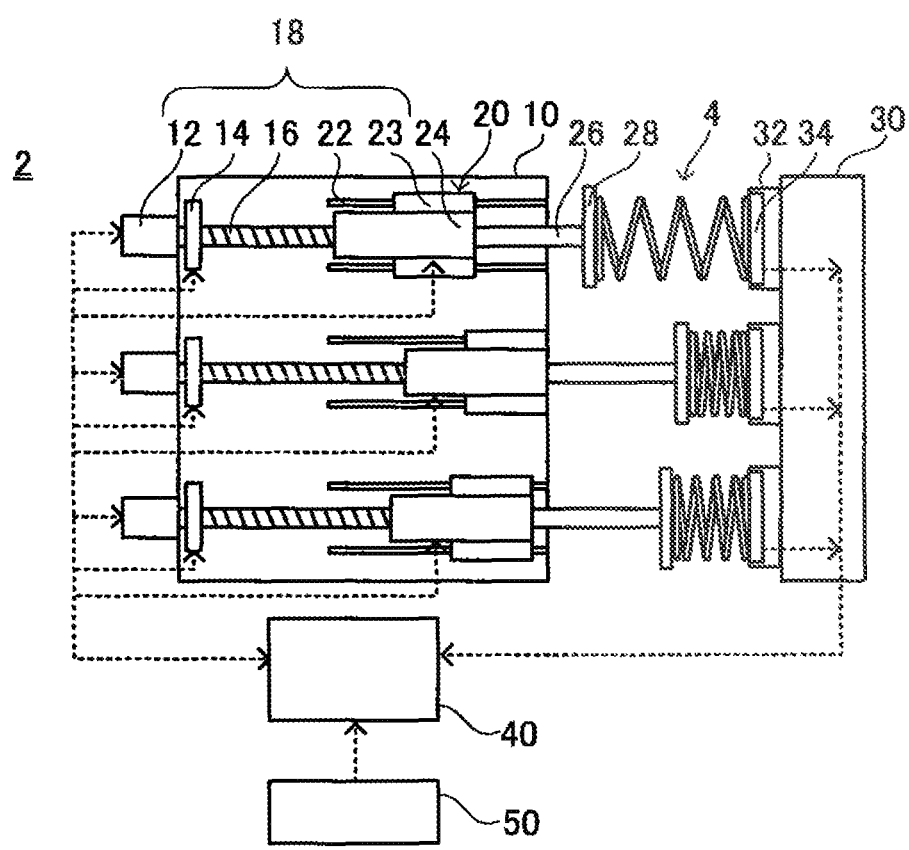
FIG. 1 is a diagram showing a schematic configuration of an adjusting apparatus according to an embodiment.

As shown in FIG. 1, the adjusting apparatus 2 has a first substrate 10 and a second substrate 30. The first substrate 10 is disposed facing the second substrate 30 with a space therebetween. A first jig 28 for holding one of ends of a spring 4 to be processed is disposed in the first substrate 10. A second jig 32 for holding the other end of the spring 4 to be processed is disposed in the second substrate 30.

The first substrate 10 has a cylinder mechanism 20 and a position adjustment mechanism 18 for adjusting a position of the cylinder mechanism 20. The cylinder mechanism 20 has a cylinder 24 and a spindle 26 driven by the cylinder 24. The first jig 28 is attached to a tip end of the spindle 26. The first jig 28 holds the one end of the spring 4 to be processed (the left-side end in FIG. 1). By supplying operating fluid into the cylinder 24, the spindle 26 moves back and forth in an axial direction, changing the state of the spindle 26 between an expanded state and a contracted state. As described hereinafter, when a prestressing process is performed on the spring 4, the cylinder mechanism 20 holds the spindle 26 in the expanded state and receives a force acting from the spring 4 by the pressure of the operating fluid inside the cylinder 24. The position of the cylinder mechanism 20 is controlled by the position adjustment mechanism 18. Note that a hydraulic cylinder, for example, can be used as the cylinder mechanism 20. The cylinder mechanism 20 is provided with a braking mechanism, not shown. Unintentional expansion and contraction of the spindle 26 can be prevented by this braking mechanism.

The position adjustment mechanism 18 has a guide 22, a slider 23, a threaded shaft 16, an electromagnetic brake 14, and a stepping motor 12. The stepping motor 12 is fixed to an edge of the first substrate 10 (i.e., an edge opposite to the one on the second substrate 30 side). The threaded shaft 16 is fixed to an output shaft of the stepping motor 12. Therefore, when the stepping motor 12 rotates, the threaded shaft 16 rotates accordingly. The threaded shaft 16 is screwed to a threaded screw hole (not shown) of the slider 23. The cylinder mechanism 20 is fixed on the slider 23. The slider 23 is supported slidably by the guide 22 formed on a surface of the first substrate 10. The guide 22 extends in a spring compression direction on the surface of the first substrate 10. Thus, when the threaded shaft 16 rotates as a result of the rotation of the stepping motor 12, the slider 23 that is screwed to the threaded shaft 16 slidingly moves in an axial direction of the threaded shaft 16 (i.e., in the spring compression direction). As a result, the cylinder mechanism 20 on the slider 23 also slidingly moves in the spring compression direction. The sliding motion of the cylinder mechanism 20 in the axial direction allows the spindle 26 and the first jig 28 to slidingly move in the axial direction. The position of the slider 23 can be adjusted by controlling the angle of rotation of the stepping motor 12.

Furthermore, the electromagnetic brake 14 is attached to the threaded shaft 16. The electromagnetic brake 14 is disposed in the vicinity of the stepping motor 12 and applies brake to the threaded shaft 16 in order to stop the rotation of the threaded shaft 16. For example, the electromagnetic brake 14 can be a device that applies frictional force to the threaded shaft 16 to stop the rotation of the threaded shaft 16. Stopping the rotation of the threaded shaft 16 using the electromagnetic brake 14 can prevent unintentional movements of the slider 23.

The second jig 32 is attached to the second substrate 30 so as to be unable to move. The second jig 32 is disposed facing the first jig 28 and holds the other end of the spring 4 to be processed (the right-side end in FIG. 1). In other words, the spring 4 is held by the first jig 28 and the second jig 32. The second jig 32 also has a load sensor 34. The load sensor 34 detects a load applied to the spring 4, which is received by the second jig 32. The load detected by the load sensor 34 is input to a control device 40, which is described hereinafter.

The adjusting apparatus 2 has the control device 40 and an input device 50. The control device 40 is connected to the stepping motor 12, the electromagnetic brake 14, the load sensor 34, and the cylinder mechanism 20, and controls drive of these components. Specifically, the control device 40 moves the slider 23 along the guide 22 by driving the stepping motor 12. The control device 40 computes the position of the slider 23 by means of a signal sent from an encoder of the stepping motor 12. The slider 23 is positioned at a desired position as a result of driving the stepping motor 12 based on the position of the slider 23 computed by the control device 40. The control device 40 also switches between a rotatable state and an unrotatable state of the threaded shaft 16 by performing on/off operations of the electromagnetic brake 14. The control device 40 also can switch between the expanded state and the contracted state of the spindle 26 by driving the cylinder mechanism 20. The position of the spindle 26 in relation to the cylinder 24 (the length of the spindle 26 in the expanded state) is detected by a sensor, not shown, and is input to the control device 40. As is clear from the description above, the control device 40 can compute the position of the first jig 28 from the positions of the slider 23 and the spindle 26 and compute the amount of compression (displacement) of the spring 4 from the computed position of the first jig 28.

Moreover, the input device 50 is connected to the control device 40. The input device 50 is capable of inputting, for example, a target length (installation length) and target load (installation load) of the spring and/or a characteristic value (e.g., a spring constant) computed from a design drawing. The control device 40 can acquire a "load-displacement" target line used for providing the spring 4 with desired spring characteristics, based on the information input by the input device 50.

The adjusting apparatus 2 shown in FIG. 1 is configured so as to be able to perform the prestressing process on three springs at the same time; however, the number of springs to be processed at the same time by the adjusting apparatus 2 may be one, two, four, or more. In addition, the spring 4 shown in FIG. 1 is a constant pitch coil spring. However, the spring that can be adjusted by the adjusting apparatus 2 may not only be a constant pitch coil spring but also, for example, an irregular pitch coil spring such as a dual pitch coil spring. The spring can also be a spiral spring that replaces compressive deformation with torsional deformation and a measured load with a torque. In addition, a detector for detecting the distance between the first jig 28 and the second jig 32 may be provided separately in order to acquire the distance between the first jig 28 and the second jig 32.

Next, operations and effects obtained when performing the prestressing process by the adjusting apparatus 2 are described with reference to FIGS. 2 to 8.

Embodiment 1

Figure 2:
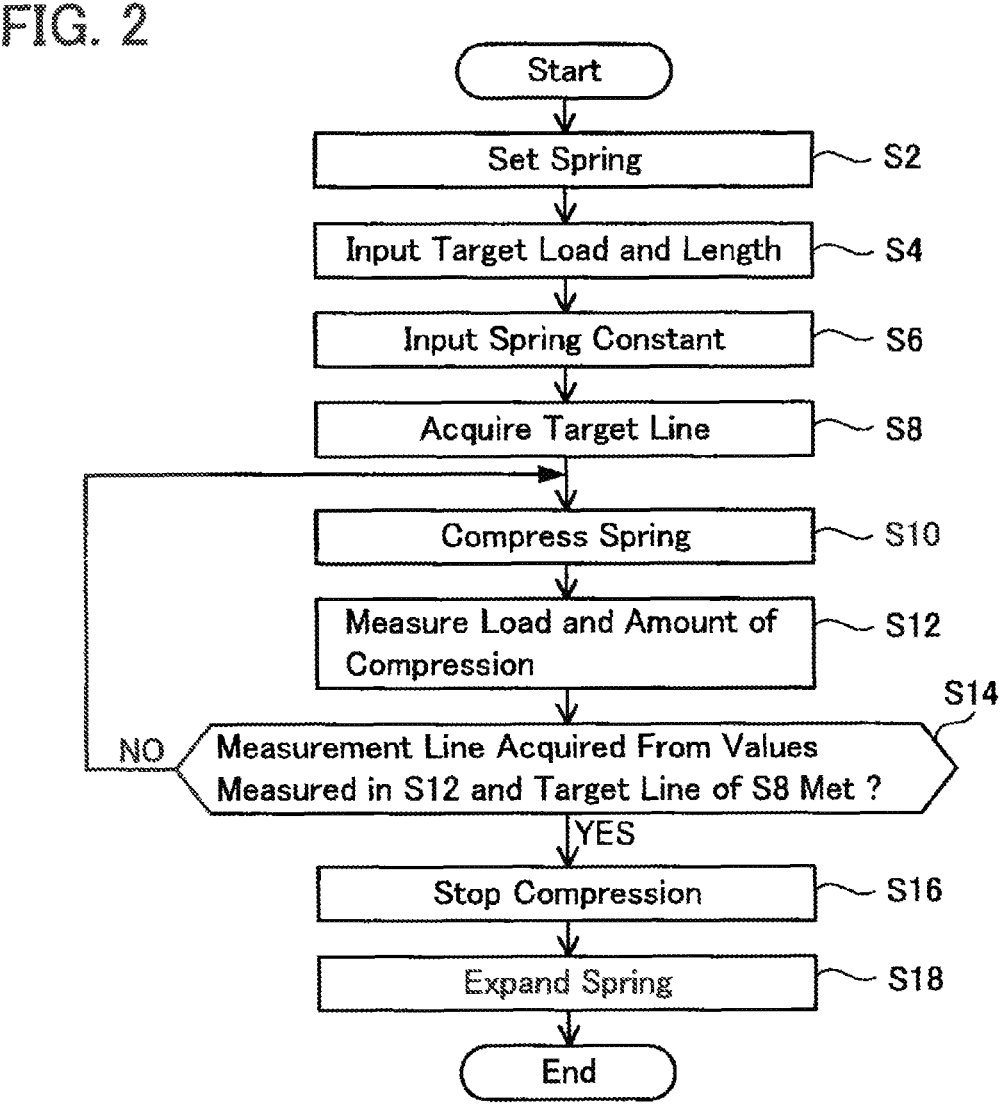
FIG. 2 is a flowchart for explaining an adjustment procedure for a spring according to Embodiment 1.
Figure 3:
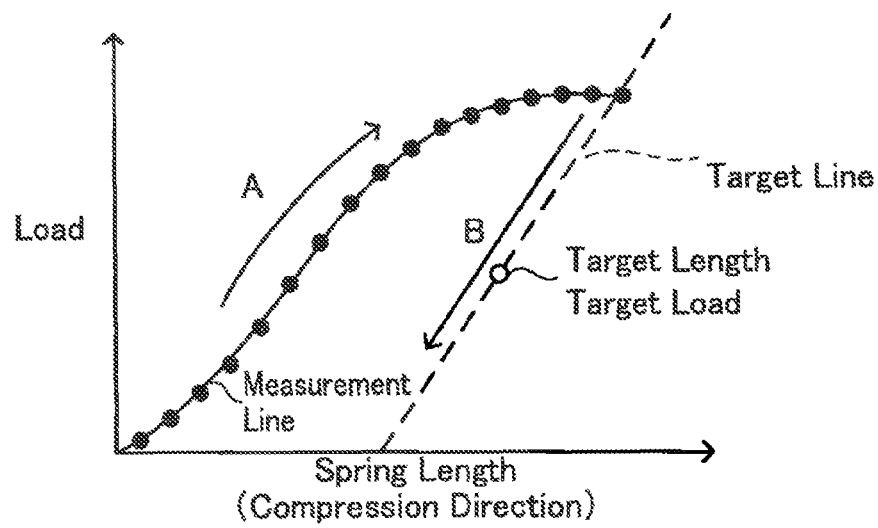
FIG. 3 is a diagram showing "load-displacement" of the spring according to Embodiment 1.

FIG. 2 is a flowchart showing a procedure for a prestressing process according to Embodiment 1, which is executed by the control device 40 of the adjusting apparatus 2. FIG. 3 shows changes in the load applied to the spring and the displacement of the spring, the changes being caused in the prestressing process of Embodiment 1. First, as shown in FIG. 2, the control device 40 drives the stepping motor 12 and the cylinder mechanism 20 to set the spring 4 between the first jig 28 and the second jig 32. More specifically, the control device 40 drives the cylinder mechanism 20 and the stepping motor 12 to slidingly move the first jig 28 in the compression direction so that the spring 4 is held between the first jig 28 and the second jig 32. Once the spring 4 is set, the control device 40 computes the position of the slider 23 and the position of the spindle 26. As a result, the position of the first jig 28 (the left-side end of the spring in FIG. 1) is specified, and a free length of the spring 4 (the length of the spring in an unloaded state) is computed.

Subsequently, an operator inputs the information on the target length (installation length) and target load (installation load) of the spring by using the input device 50 (S4), and further inputs the information on the spring constant calculated from the design drawing (S6). In S8, the control device 40 determines the "load-displacement" target line based on the information on the target length and target load of the spring that are input in S4 and the information on the spring constant input in S6. In other words, as shown in FIG. 3, the "load-displacement" target line is a straight line passing through the point of the target length and target load input in S4. The slope of this straight line is the spring constant input in S6. Thus, the control device 40 determines a linear function expressing the "load-displacement" target line (F=k·x+h (F: load, k: spring constant, x: displacement in compression direction, h: constant)).

Next, the control device 40 drives the stepping motor 12 and the cylinder mechanism 20 to slidingly move the first jig 28 in the compression direction and reduces the distance between the first jig 28 and the second jig 32 to compress the spring 4, as shown in S10. Thereafter, in S12, the control device 40 computes the displacement (the amount of compression) in the length of the spring 4 from the amount of drive of the stepping motor 12 and the position of the spindle 26, and acquires the load applied to the spring 4, from the load sensor 34. Specifically, the control device 40 calculates the position of the first jig 28 from the amount of drive of the stepping motor 12 and the position of the spindle 26, to compute the length of the spring 4 (the total length). Because the free length of the spring 4 is computed in step S2, the control device 40 computes the amount of compression of the spring 4 from this free length and the current total length of the spring 4. Once the amount of compression of the spring 4 and the load applied to the spring 4 are obtained, a "load-displacement" measurement line of the spring 4 is acquired. The acquired "load-displacement" measurement line forms a curved line connecting measurement data measured in step S12, as shown in FIG. 3.

In S14, the control device 40 determines whether or not the "load-displacement" measurement line obtained from the values measured in step S12 meets the "load-displacement" target line determined in step S8. When the "load-displacement" measurement line does not meet the "load-displacement" target line (NO in step S14), the control device 40 returns to step S10 to repeat the processes from step S10. In this manner, the control device 40 compresses the spring 4 until the "load-displacement" measurement line meets the "load-displacement" target line. In other words, the control device 40 executes the processes expressed by A in FIG. 3.

When the "load-displacement" measurement line meets the "load-displacement" target line (YES in step S14), the control device 40 drives the electromagnetic brake 14 and stops the cylinder mechanism 20, to stop compressing the spring 4 (S16). Further, as shown in S18, the control device 40 cancels the drive of the electromagnetic brake 14 and drives the stepping motor 12 and the cylinder mechanism 20 to slidingly move the first jig 28 in an expansion direction (the direction opposite to the compression direction), and then expands the spring 4 until the load applied to the spring enters the unloaded state along the "load-displacement" target line. In other words, the control device 40 executes the processes expressed by B in FIG. 3. As a result, the spring 4 with the desired spring characteristics (the characteristics corresponding to the "load-displacement" target line) is obtained.

In Embodiment 1 described above, the "load-displacement" target line is computed based on the target length (installation length) and target load (installation load), as well as the spring constant calculated from the design drawing, and then the processes described above are carried out. In this manner, the spring can be adjusted to have target spring characteristics. Especially, in Embodiment 1 the "load-displacement" measurement line is acquired by compressing the spring while measuring the load applied to the spring and the displacement of the spring, and timing for stopping the process of compressing the spring 4 is determined based on whether or not the "load-displacement" measurement line meets the "load-displacement" target line. Therefore, even when the characteristics of the spring 4 to be processed fluctuate in an elastic region and plastic region of the spring 4, the timing for stopping the compression process can be determined in consideration of the fluctuations. For this reason, the spring characteristics of the spring 4 can be adjusted accurately.

It should be noted that in Embodiment 1 the "load-displacement" target line is computed based on the spring constant calculated from the design drawing; however, the spring constant may be computed based on the measured load and displacement. For instance, the spring constant may be computed based on the measured values (the amount of compression, the load applied to the spring) that are initially obtained when the compression process is started, and then the "load-displacement" target line may be computed based on this spring constant. It is preferred that the spring constant be computed based on a plurality of measured values, so that the spring constant can be computed accurately.

Embodiment 2

Figure 4A:
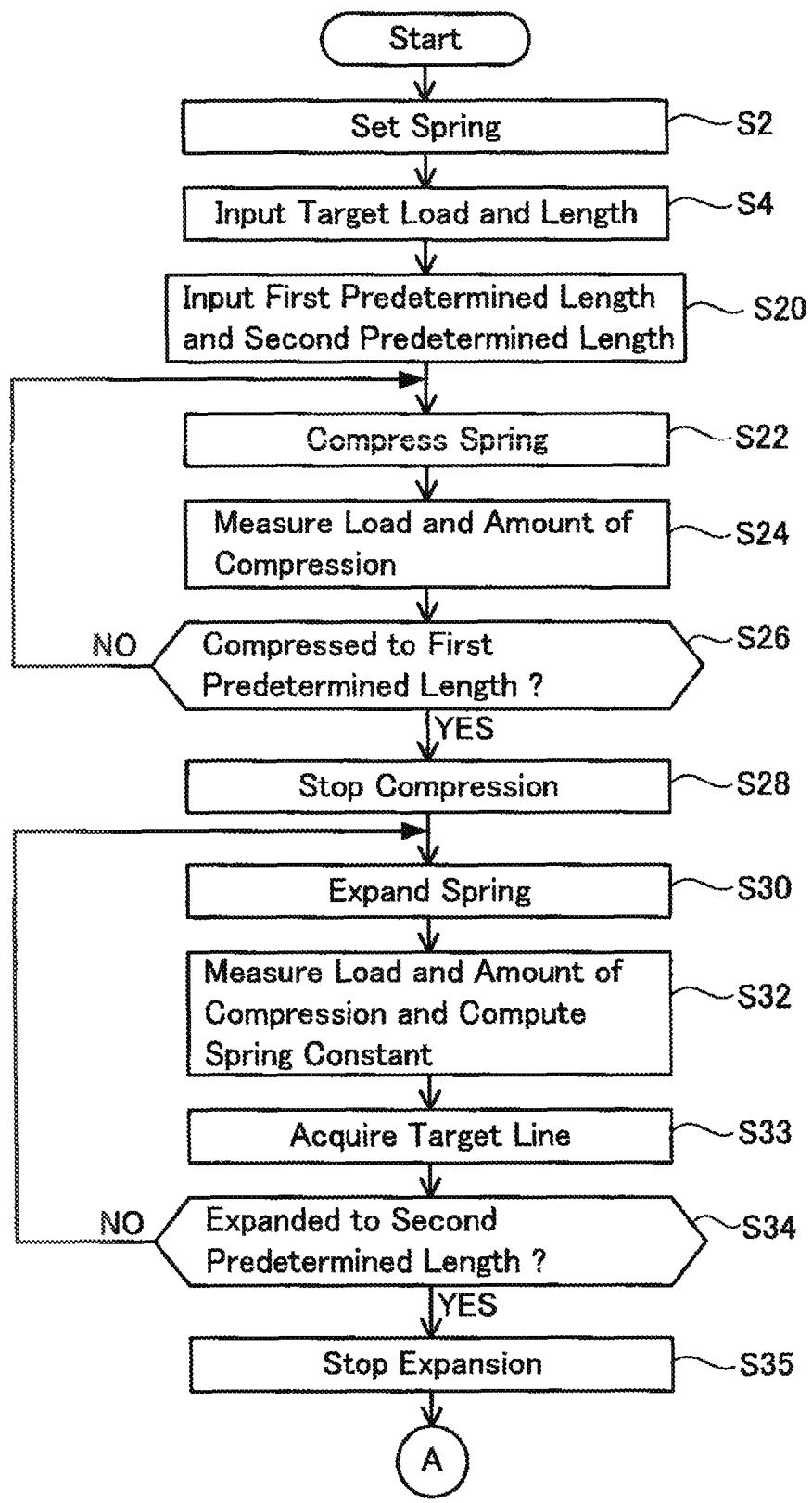
FIG. 4A is a flowchart (1) for explaining an adjustment procedure for a spring according to Embodiment 2.
Figure 4B:
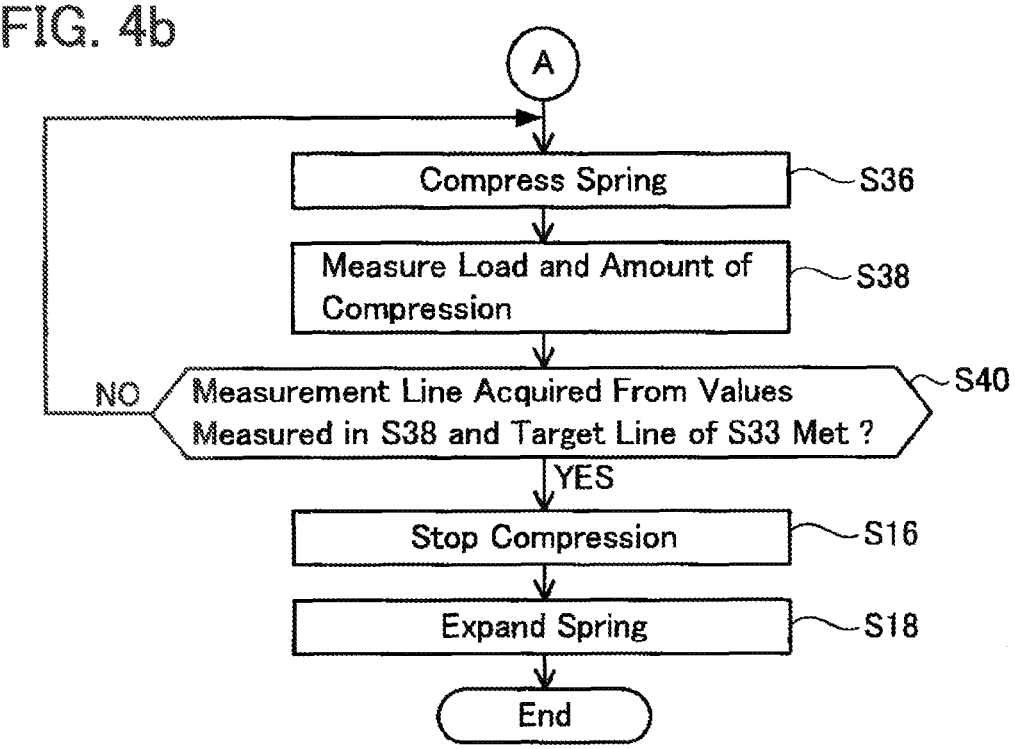
FIG. 4B is a flowchart (2) for explaining the adjustment procedure for the spring according to Embodiment 2.
Figure 5:
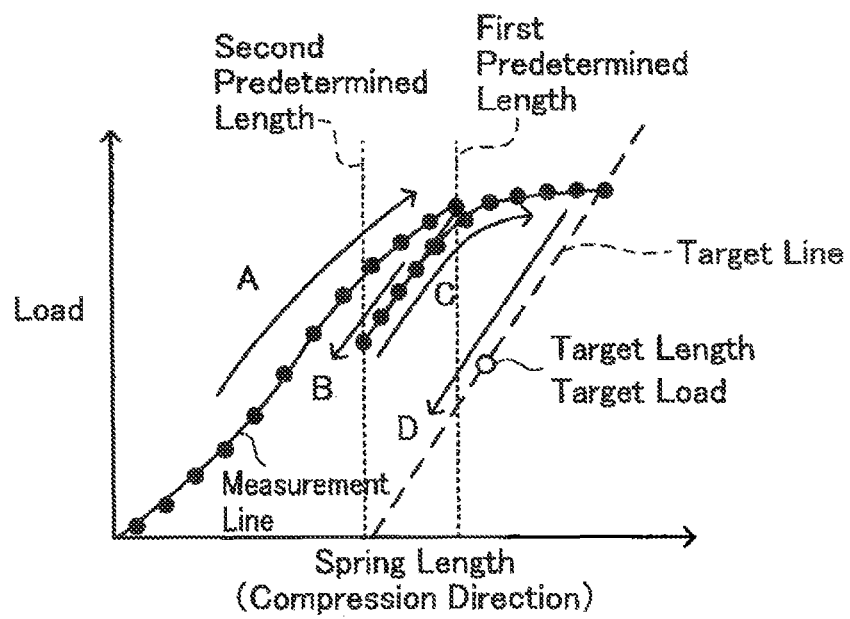
FIG. 5 is a diagram showing "load-displacement" of the spring according to Embodiment 2.

FIGS. 4A and 4B show procedures for a prestressing process according to Embodiment 2. FIG. 5 shows "load-displacement" lines obtained in the prestressing process. The prestressing process according to Embodiment 2 has substantially the same procedure as that of the prestressing process according to Embodiment 1 described above, but the procedure for acquiring the "load-displacement" target line in Embodiment 2 is different from that of Embodiment 1. Therefore, detailed descriptions of steps in the same procedure as that of Embodiment 1 are omitted, and different steps are described in detail.

In Embodiment 2 as well, the same steps as steps S2 and S4 of FIG. 2 are executed, and subsequently step S20 shown in FIG. 4A is performed. In step S20, the operator inputs information on first and second predetermined lengths by means of the input device 50. Next, in step S22, the control device 40 drives the stepping motor 12 and the cylinder mechanism 20 to compress the spring 4 set between the first jig 28 and the second jig 32. The control device 40 then computes a displacement (the amount of compression) in the length of the spring 4 from the amount of drive of the stepping motor 12 and the amount of drive of the cylinder mechanism 20, and measures a load applied to the spring 4 based on an output from the load sensor 34 (S24). The control device 40 subsequently determines, from the amount of compression measured in step S24, whether or not the length of the spring 4 is equal to the first predetermined length (S26). The first predetermined length may be determined appropriately in accordance with a plastic deformation margin of the spring 4. When the plastic deformation margin of the spring 4 is small, the first predetermined length may be greater than the target length (installation length) of the spring. However, when the plastic deformation margin of the spring 4 is large, the first predetermined length may be lower than the target length (installation length) of the spring. The first predetermined length may be determined in consideration with fluctuations in the amount of plastic deformation of the spring 4. In a specific procedure, for example, the "load-displacement" measurement line can be acquired by measuring the load applied to the spring 4 and the displacement of the spring 4, and then the first predetermined length can be determined based on the acquired "load-displacement" measurement line. When it is determined, from the amount of compression measured in step S24, that the length of the spring 4 is not the first predetermined length (NO in step S26), the control device 40 returns to step S22 to repeat the processes from step S22. In this manner, the spring 4 is compressed until the length of the spring 4 becomes the first predetermined length. In other words, the control device 40 executes the processes expressed by A in FIG. 5.

When it is determined, from the amount of compression measured in step S24, that the length of the spring 4 is the first predetermined length (YES in step S26), the control device 40 stops compressing the spring 4 (S28) and expands the spring 4 (S30). In other words, the control device 40 drives the electromagnetic brake 14 and stops driving the cylinder mechanism 20, in order to stop compressing the spring 4. Next, the control device 40 cancels the drive of the electromagnetic brake 14 and drives the stepping motor 12 and the cylinder mechanism 20, to slidingly move the first jig 28 in the expansion direction and expand the spring 4. In so doing, the control device 40 computes the length (the amount of compression) of the spring 4 from the amount of drive of the stepping motor 12 and the amount of drive of the cylinder mechanism 20, measures the load applied to the spring 4 based on the output from the load sensor 34, and computes a spring constant from these obtained values (S32). It is preferred that the spring constant be computed based on a plurality of measured values (the amount of compression, the load value), in order to reduce the impact of the fluctuations in the measured values. Once the spring constant is computed, the "load-displacement" target line is computed, as in Embodiment 1 described above. Note that in FIG. 5 the expansion process for computing the spring constant corresponds to the processes expressed by B.

Once the "load-displacement" target line is computed in step S33, the control device 40 determines, from the amount of compression measured in step S32, whether or not the spring 4 expands to the second predetermined length (S34). The second predetermined length may be determined appropriately in accordance with the first predetermined length determined in step S26. For example, the second predetermined length may be determined in a manner as to obtain the measured values that allow the spring constant to be accurately computed in step S32. When it is determined from the amount of compression measured in step S32 that the length of the spring 4 is not the second predetermined length (NO in step S34), the control device 40 returns to step S30 to repeat the processes from step S30. In this manner, the spring 4 is expanded until the length thereof becomes the second predetermined length. When it is determined from the amount of compression measured in step S32 that the length of the spring 4 is equal to the second predetermined length (YES in step S34), the control device 40 drives the electromagnetic brake 14 and stops driving the cylinder mechanism 20, to stop expanding the spring 4 (S35). The control device 40 then executes the processes of steps S36 to S40 shown in FIG. 4B. Steps S36 to S40 correspond to steps S10 to S14 described in Embodiment 1. In this manner, the spring 4 is compressed until the "load-displacement" measurement line meets the "load-displacement" target line. In other words, the control device 40 executes the processes expressed by C in FIG. 5. When the "load-displacement" measurement line meets the "load-displacement" target line, steps S16 and S18 of Embodiment 1 are executed, whereby the spring 4 is expanded until the load applied to the spring enters the unloaded state along the "load-displacement" target line (the processes expressed by D in FIG. 5).

The prestressing process according to Embodiment 2 described above compresses the spring first and then expands the spring to measure the spring constant thereof. Then, the "load-displacement" target line is computed based on the measured spring constant. Because the "load-displacement" target line is computed based on the measured spring constant, the "load-displacement" target line is computed in consideration of fluctuations that might occur in the spring constant of the spring 4. For this reason, the spring characteristics of the spring 4 can be adjusted accurately. Especially, in Embodiment 2, the spring 4 is compressed first and then expanded, and the spring constant thereof is computed using the measured value obtained when the spring is expanded. This can eliminate the influence of the plastic deformation that occurs in the plastic region of the spring 4, whereby the spring constant can be computed accurately. In this manner, the spring characteristics of the spring 4 can be adjusted accurately.

Embodiment 3

Figure 6A:
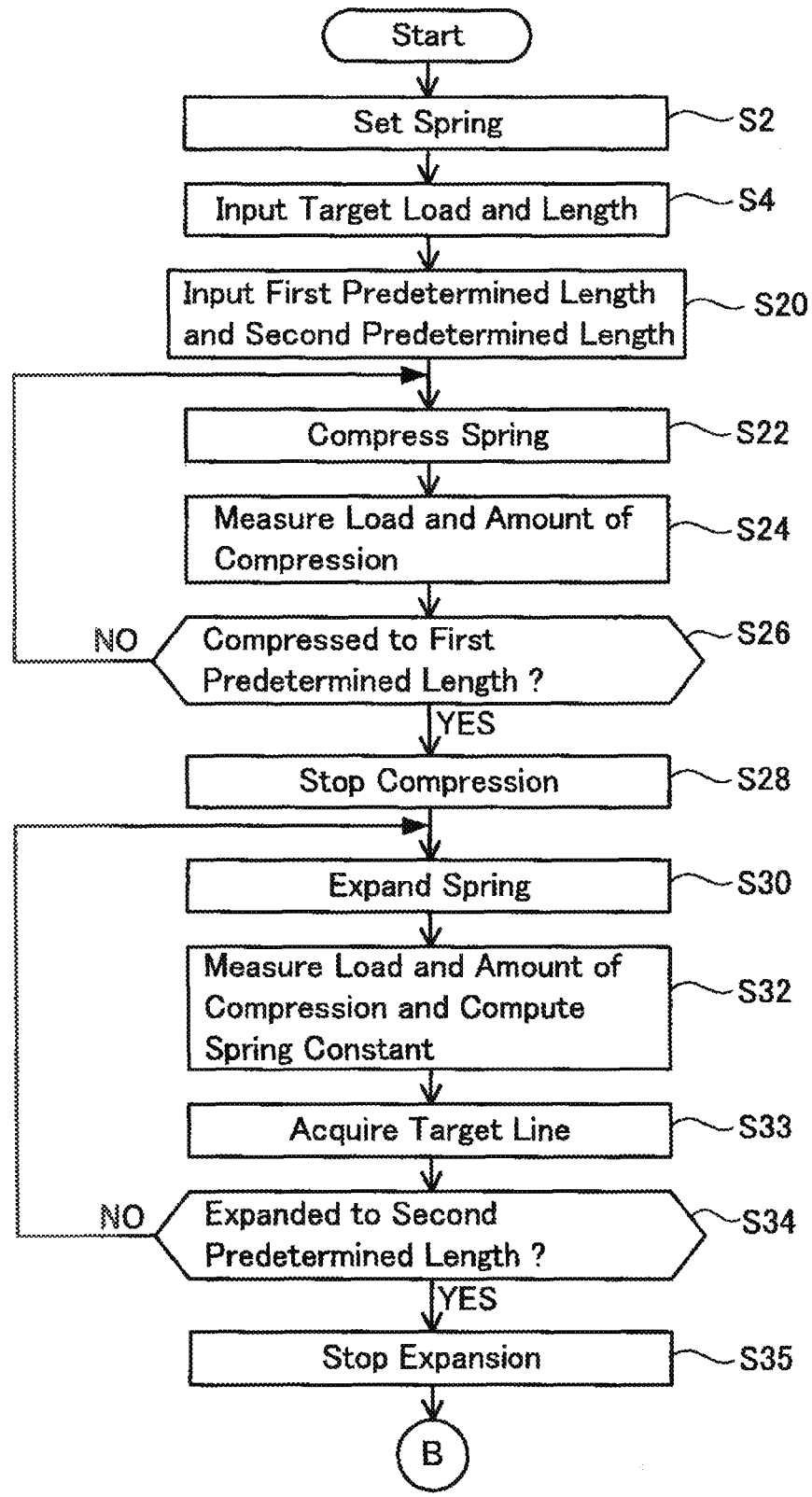
FIG. 6A is a flowchart (1) for explaining an adjustment procedure for a spring according to Embodiment 3.
Figure 7:
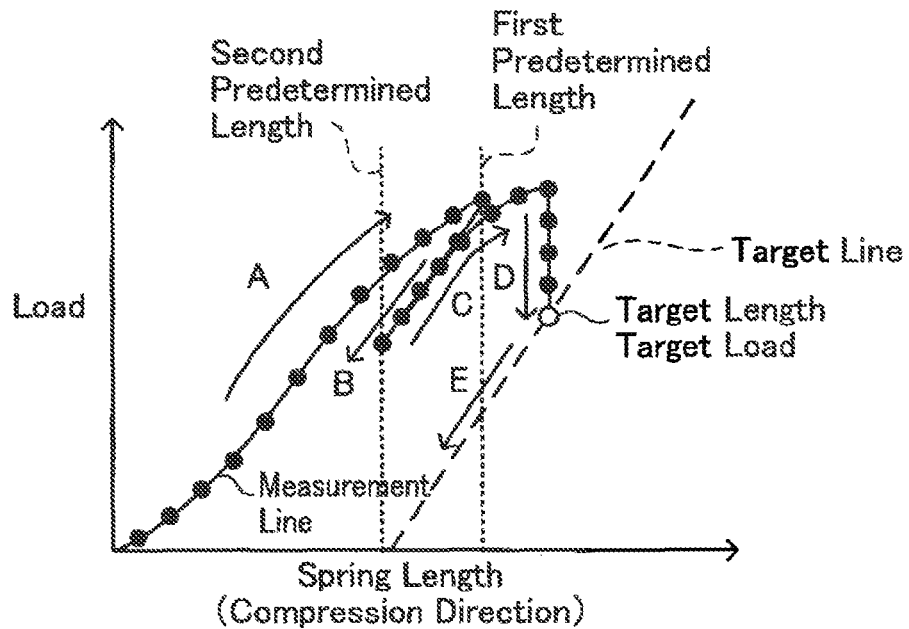
FIG. 7 is a diagram showing "load-displacement" of the spring according to Embodiment 3.

FIGS. 6A and 6B show procedures for a prestressing process according to Embodiment 3. FIG. 7 shows "load-displacement" lines obtained in the prestressing process. The prestressing process according to Embodiment 3 has substantially the same procedure as that of the prestressing process according to Embodiment 2 described above, but the processes performed on the spring 4 when the "load-displacement" measurement line meets the "load-displacement" target line are different from those of Embodiment 2. Therefore, detailed descriptions of steps in the same procedure as that of Embodiment 2 are omitted, and different steps are described in detail.

In Embodiment 3, steps S2 and S4 shown in FIG. 2 are executed first, and then steps S20 to S35 shown in FIG. 6A are executed (processes expressed in A→B shown in FIG. 7). As a result, the control device 40 acquires the "load-displacement" target line. Thereafter, the control device 40 executes processes of S50 to S54 shown in FIG. 6B, whereby the spring 4 is compressed to a target length (processes expressed by C in FIG. 7). Once the spring 4 is compressed to the target length (YES in step S54), the control device 40 stops compressing the spring (S56). In so doing, the control device 40 stops driving the cylinder mechanism 20 while keeping the electromagnetic brake 14 ON, so that the slider 23 and the first jig 28 do not move. Consequently, the spring 4 is kept fixed without having the amount of compression of the spring changed. Leaving the spring 4 in such a state deforms the spring 4 by mechanical creep, gradually reducing reaction force of the spring 4.

In step S58, the control device 40 measures the reaction force of the spring 4 from a detection signal obtained from the load sensor 34. The control device 40 then determines whether or not the "load-displacement" measurement line meets the "load-displacement" target lint, the "load-displacement" measurement line being obtained from the reaction force measured in step S58 (S60). When it is determined that the "load-displacement" measurement line does not meet the "load-displacement" target line (NO in step S60), the processes from step S58 are repeated. Thus, the spring 4 keeps deforming by mechanical creep until the "load-displacement" measurement line meets the "load-displacement" target line (processes expressed by D in FIG. 7). When it is determined that the "load-displacement" measurement line meets the "load-displacement" target line (YES in step S60), step S62 is executed, whereby the spring 4 is expanded until the load applied to the spring enters the unloaded state along the "load-displacement" target line (processes expressed by E in FIG. 7).

The prestressing process of Embodiment 3 described above compresses the spring 4 first, then fixes the length of the spring 4, and then deforms the spring 4 by mechanical creep until the "load-displacement" measurement line meets the "load-displacement" target line. This can prevent mechanical vibrations of the adjusting apparatus 2 and allow more accurate measurement of load values. In this manner, the spring characteristics of the spring 4 can be measured accurately.

Specific examples of the present invention are described above in detail, but these examples are merely illustrative and place no limitation on the scope of the patent claims. The technology described in the patent claims also encompasses various changes and modifications to the specific examples described above.

For instance, each of these embodiments above has described an example in which the prestressing process is performed on the spring at a normal temperature; however, the prestressing process may be executed in a warm state. Any of Embodiments 1 to 3 described above may be used as the prestressing procedure itself. Executing the prestressing process in the warm state can allow the spring to creep-deform easily. Therefore, the prestressing process can be performed in a short time. However, the spring constant of the spring (the modulus of rigidity for spring steel) changes depending on the temperature of the spring. Normally, the target load (installation load) is set according to the temperature (normal temperature) at which the spring is used. Therefore, the target load for determining the "load-displacement" target line is preferably adjusted based on the temperature of the spring when the prestressing process is performed. For example, the rate of change α (%) of the modulus of rigidity in relation to the temperature is estimated beforehand by experiment, and, when the temperature of the spring during the prestressing process is higher than the normal temperature by PC and the target load obtained during the use of the spring is F1, a target load F2 for determining the "load-displacement" target line is (1−T×α/100)×F1. The spring characteristics can be adjusted accurately by adjusting the target load based on the temperature of the spring obtained in the prestressing process. In addition, when the design value is used as the spring constant, it is preferred that the spring constant for determining the "load-displacement" target line be adjusted based on the temperature of the spring obtained in the prestressing process. In this manner, the "load-displacement" target line can be determined accurately. Note that the temperature of the spring may be measured during or prior to the prestressing process. A thermograph, for example, can be used for measuring the temperature of the spring.

When the temperature of the spring obtained in the prestressing process is set high, in some cases the "load-displacement" measurement line meets the "load-displacement" target line without compressing the spring to the length above the target length (installation length). In other words, since the spring deforms by mechanical creep, the "load-displacement" measurement line meets the "load-displacement" target line before the spring reaches the target length. Thus, when the temperature of the spring obtained in the prestressing process is kept high, the mechanical strength required in the adjusting apparatus 2 and the amount of stroke required to compress the spring can be kept low.

Figure 8:
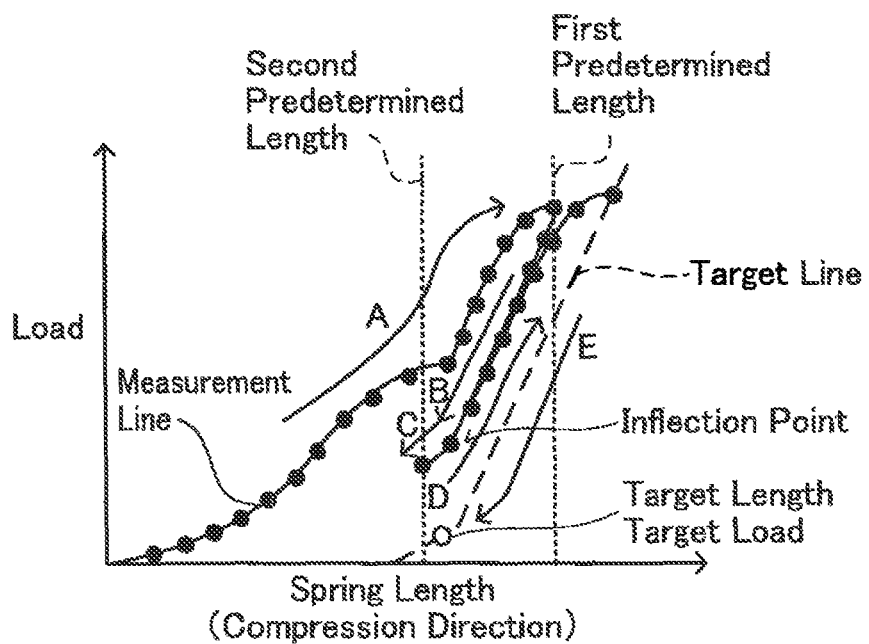
FIG. 8 is a diagram showing "load-displacement" of a spring according to Embodiment 5.

Each of the embodiments above has described an example in which the spring characteristics of the constant pitch coil spring are adjusted. However, the technology of the present application can be used for adjusting the spring characteristics of various springs, including a constant pitch coil spring. For example, the prestressing method of the present application can also be used for adjusting the spring characteristics of a dual pitch coil spring. FIG. 8 shows "load-displacement" lines that are obtained when the spring characteristics of a dual pitch coil spring are adjusted by the prestressing method of the present application. Note that in the example shown in FIG. 8, the same prestressing process as that of Embodiment 2 is executed.

In the dual pitch coil spring, the pitches between spring coils changes in two stages. For this reason, in an initial stage of the compression process, the entire spring coils function as the spring, and the constant spring thereof is small. However, the coil springs with narrow pitches come close to each other as the compression of the spring advances, reducing the lengths of the sections functioning as the spring. As a result, the spring constant increases. Therefore, the spring constant needs to be measured in two stages in order to acquire the "load-displacement" target line. As shown in FIG. 8, first, the spring is compressed to the first predetermined length at which the spring constant changes in two stages, while acquiring the "load-displacement" measurement line (processes expressed by A in FIG. 8). The first predetermined length may be determined based on design data of the spring such that the spring constant changes in two stages. Subsequently, the spring constant and an inflection point are measured, while expanding the spring (processes expressed by B and C in FIG. 8). The "inflection point" here means the point where the spring constant changes. In the example shown in FIG. 8, the inflection point means an intersection between the "load-displacement" measurement line obtained by the processes expressed by B and the "load-displacement" measurement line obtained by the processes expressed by C. In so doing, because there are two spring constants, the spring is expanded until the two spring constants can be measured. Once the two spring constants and the inflection point are measured, the "load-displacement" target line is computed based on these spring constants and the inflection point. As shown in the dashed line in FIG. 8, the "load-displacement" target line is bent in two stages. Once the "load-displacement" target line is computed, the spring is compressed again until the "load-displacement" measurement line meets the "load-displacement" target line, as in the embodiments described above (processes expressed by D in FIG. 8). When the "load-displacement" measurement line meets the "load-displacement" target line, compression of the spring is stopped, and then the spring is expanded along the "load-displacement" target line (processes expressed by E in FIG. 8). In these processes, the spring characteristics of the dual pitch coil spring can be adjusted.

As is clear from the descriptions above, when a spring to be processed is a nonlinear spring, the prestressing process may be performed thereon by taking the "load-displacement" target line as a nonlinear line. In this case as well, the "load-displacement" measurement line is acquired from the measured load and displacement. Therefore, the spring characteristics of the spring can be adjusted accurately.

Further, the technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

The invention claimed is:

1. A method for adjusting spring characteristics of a spring to desired spring characteristics, the method comprising: a first step of changing a load applied to the spring and a displacement of the spring until a load-displacement measurement line meets a load-displacement target line, the load-displacement measurement line being obtained by measuring the load applied to the spring and the displacement of the spring, and the load-displacement target line being determined based on load-displacement characteristics of the spring and the desired spring characteristics, and a second step of changing the displacement of the spring after the first step such that the load applied to the spring decreases along the load-displacement target line, wherein the load-displacement characteristics of the spring is a spring constant, the spring constant being determined from the load applied to the spring and the displacement of the spring measured in the first step, and the first step comprises: a first substep of compressing the spring until a length of the spring reaches a first predetermined length, a second substep of measuring, after the first substep, the load-displacement characteristics of the spring by measuring the load and the displacement of the spring while expanding the spring until the length of the spring reaches a second predetermined length, and a third substep of changing, after the second substep, the load applied to the spring and the displacement of the spring while measuring the load and the displacement of the spring until the load-displacement measurement line meets the load-displacement target line.

2. The method as in claim 1, wherein the desired spring characteristics are an installation length of the spring and an installation load of the spring generated when the spring is compressed to the installation length.

3. The method as in claim 2, wherein in the first and second steps, the load applied to the spring and the displacement of the spring are changed in a warm state, and the installation load of the spring is adjusted based on a temperature of the spring measured during or before the first step.

4. The method as in claim 3, wherein the third substep comprises: compressing the spring until a length of the spring reaches a third predetermined length, and after the compressing, deforming the spring by mechanical creep until the load-displacement measurement line meets the load-displacement target line.

5. The method as in claim 2, wherein the third substep comprises: compressing the spring until a length of the spring reaches a third predetermined length, and after the compressing, deforming the spring by mechanical creep until the load-displacement measurement line meets the load-displacement target line.

6. A method for manufacturing a spring, comprising the method for adjusting spring characteristics of a spring as in claim 1.

* * * * *